United States Patent
Gieras et al.

(10) Patent No.: US 8,461,732 B2
(45) Date of Patent: *Jun. 11, 2013

(54) TRANSVERSE REGULATED FLUX ALTERNATOR

(75) Inventors: Jacek F. Gieras, Glastonbury, CT (US); Gregory I. Rozman, Rockford, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 202 days.

This patent is subject to a terminal disclaimer.

(21) Appl. No.: 12/559,593

(22) Filed: Sep. 15, 2009

(65) Prior Publication Data

US 2011/0062833 A1  Mar. 17, 2011

(51) Int. Cl.
*H02K 11/00* (2006.01)

(52) U.S. Cl.
USPC ............ 310/68 R; 310/254.1; 310/216.023

(58) Field of Classification Search
USPC ............ 310/68 R, 179, 180, 184, 185, 254.1, 310/216.019, 216.023, 216.035–216.039, 310/216.071–216.076, 216.079–216.082, 310/216.099, 216.103, 112–114, 266
See application file for complete search history.

(56) References Cited

U.S. PATENT DOCUMENTS

| | | | |
|---|---|---|---|
| 4,451,752 A * | 5/1984 | Tahara et al. | 310/186 |
| 5,773,910 A | 6/1998 | Lange | |
| 6,545,382 B1 * | 4/2003 | Bennett | 310/216.023 |
| 6,628,034 B2 * | 9/2003 | Jang et al. | 310/210 |
| 6,657,329 B2 * | 12/2003 | Kastinger et al. | 310/254.1 |
| 6,936,948 B2 * | 8/2005 | Bell et al. | 310/201 |
| 6,949,855 B2 | 9/2005 | Dubois et al. | |
| 7,312,549 B2 | 12/2007 | Rasmussen | |
| 7,408,327 B2 | 8/2008 | Shah et al. | |
| 7,439,713 B2 * | 10/2008 | Dooley | 322/22 |
| 7,459,822 B1 | 12/2008 | Johnson et al. | |
| 7,466,058 B2 | 12/2008 | Dubois et al. | |
| 7,472,547 B2 | 1/2009 | Grosskopf et al. | |
| 7,474,019 B2 | 1/2009 | Kang et al. | |
| 7,486,053 B2 | 2/2009 | Qi et al. | |
| 7,550,953 B2 | 6/2009 | Shah | |
| 7,560,840 B2 | 7/2009 | Lange et al. | |
| 7,579,742 B1 | 8/2009 | Rittenhouse | |
| 2002/0074891 A1 * | 6/2002 | Gieras et al. | 310/254 |

* cited by examiner

*Primary Examiner* — Dang Le
(74) *Attorney, Agent, or Firm* — Carlson, Gaskey & Olds

(57) ABSTRACT

An alternator has a rotor to be associated with a prime mover shaft and driven for rotation. The rotor is provided with permanent magnets. A stator has pole pieces, including a main winding and flux diverters separating the main winding from a control coil. Control is provided for controlling the power passing through the control coil. The alternator is a transverse flux machine. A vehicle power system including the alternator is also disclosed.

18 Claims, 6 Drawing Sheets

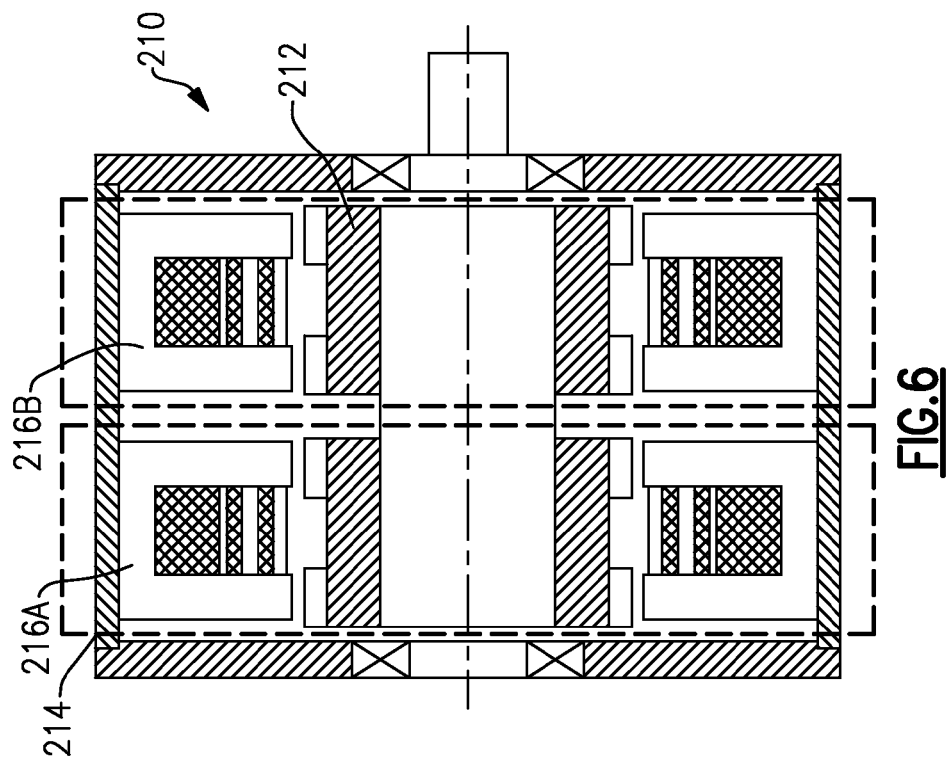
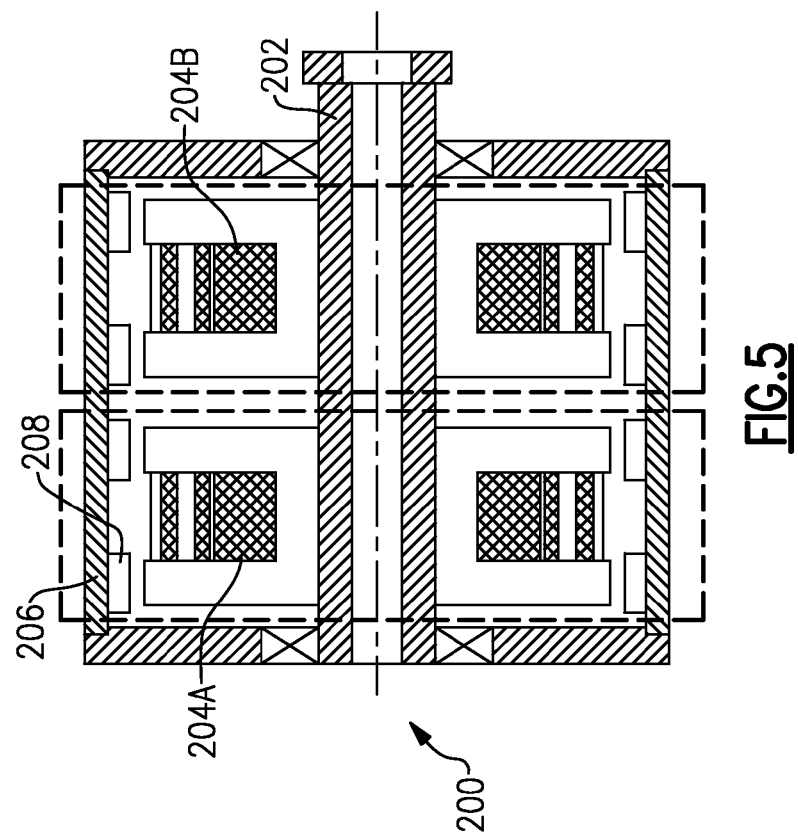

TRANSVERSE REGULATED FLUX ALTERNATOR

BACKGROUND OF THE INVENTION

This application relates to a transverse flux machine with voltage regulation that is utilized as an alternator.

Typically, a permanent magnet generator or motor operates as a parallel flux machine. An electromagnetic force (torque) vector extends in a direction that is parallel to a flux path through the stator and rotor.

So-called transverse flux machines are also known, wherein the torque (force) vector from the flux is perpendicular to the flux path.

Alternators have become widely utilized in vehicle electric generation systems. One challenge with the use of such alternators is that the prime mover, which generates rotation of a rotor in the generator, often has a variable speed. Many electrical systems need a constant voltage and frequency output, and the varying speed of the prime mover raises challenges.

SUMMARY OF THE INVENTION

An alternator has a rotor to be associated with a prime mover shaft and driven for rotation. The rotor is provided with permanent magnets. A stator has pole pieces, including a main winding and flux diverters separating the main winding from a control coil. Control is provided for controlling the power passing through the control coil. The alternator is a transverse flux machine.

A vehicle power system including such an alternator is also claimed.

These and other features of the present invention can be best understood from the following specification and drawings, the following of which is a brief description.

BRIEF DESCRIPTION OF THE DRAWINGS

FIG. 5 shows an embodiment of this invention.

FIG. 6 shows another embodiment of this invention.

DETAILED DESCRIPTION OF THE EMBODIMENTS

Figure 1:
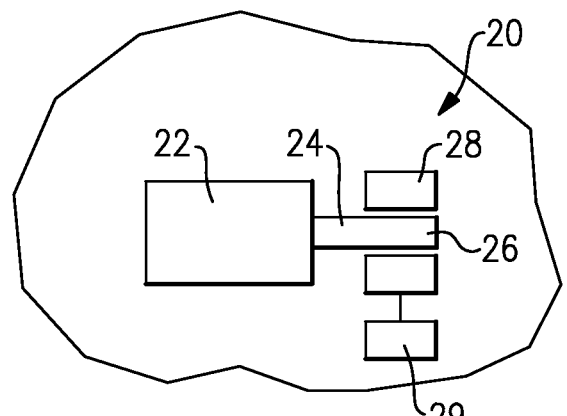
FIG. 1 schematically shows a vehicle power generation system.

FIG. 1 shows a vehicle 20 incorporating a prime mover 22, such as an engine. The engine may be a gas turbine engine on a vehicle, an IC engine associated with the vehicle, or any other type of source of rotation. The prime mover 22 drives a shaft 24. The shaft 24 is associated with a rotor 26 of a generator, and a stator 28 is associated with the rotor 26. Power is tapped from stator 28 to a user, such as a power bus 29. This is an extremely schematic view of the basic components in a power generation system for the vehicle 20.

Figure 2:
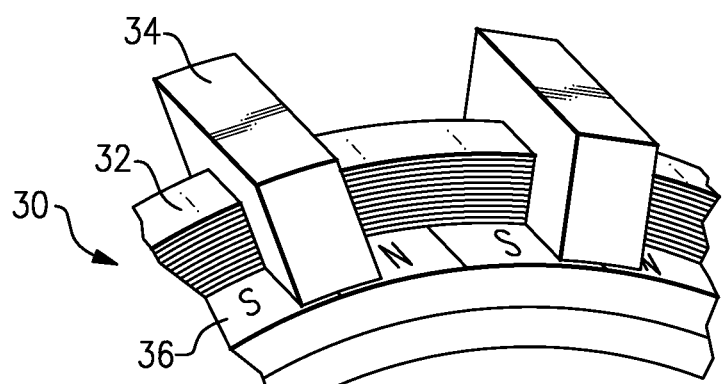
FIG. 2 shows a first embodiment architecture.

FIG. 2 shows a first arrangement 30 for a transverse flux generator, and shows a stator having cylindrical coil 32 associated with pole pieces 34. A rotor 38 is provided with permanent magnets 36.

Figure 3:
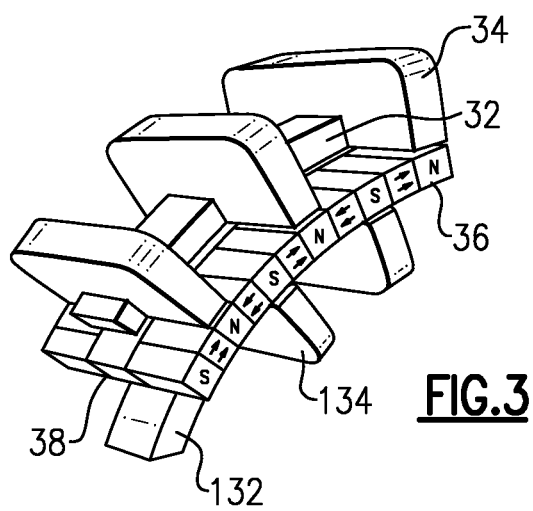
FIG. 3 shows a second embodiment architecture.

FIG. 3 shows a double-sided machine wherein there is an additional coil 132 and pole pieces 134 on an opposed side of the rotor 38. These basic arrangements of transverse flux machines can be utilized in the embodiments as set forth below.

Figure 4A:
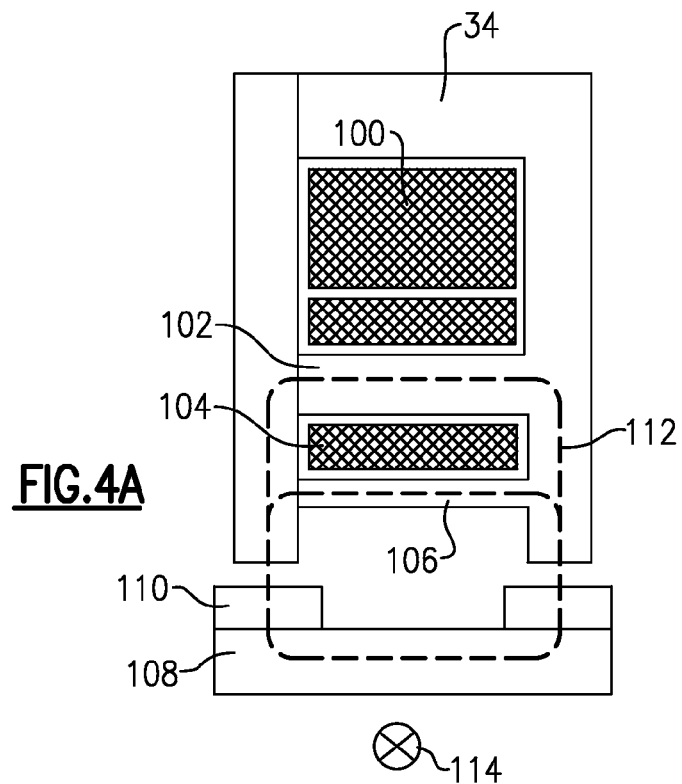
FIG. 4A shows a transverse flux regulated machine in a first condition.

FIG. 4A shows a stator and pole piece 34 having an internal armature coil 100 with flux diverters 102 and 106 separating a control coil 104. As shown, the rotor 108 and its associated permanent magnets 110 are positioned adjacent to the pole piece 34.

In the condition shown in FIG. 4A, there is zero control current passing through the coil 104. In this condition, the permeability of the diverters 102 and 106 is high, and its reluctance is low. Almost the entire magnetic flux produced by the rotor permanent magnets passes through the diverters 102 and 106, missing the armature winding 100.

Figure 4B:
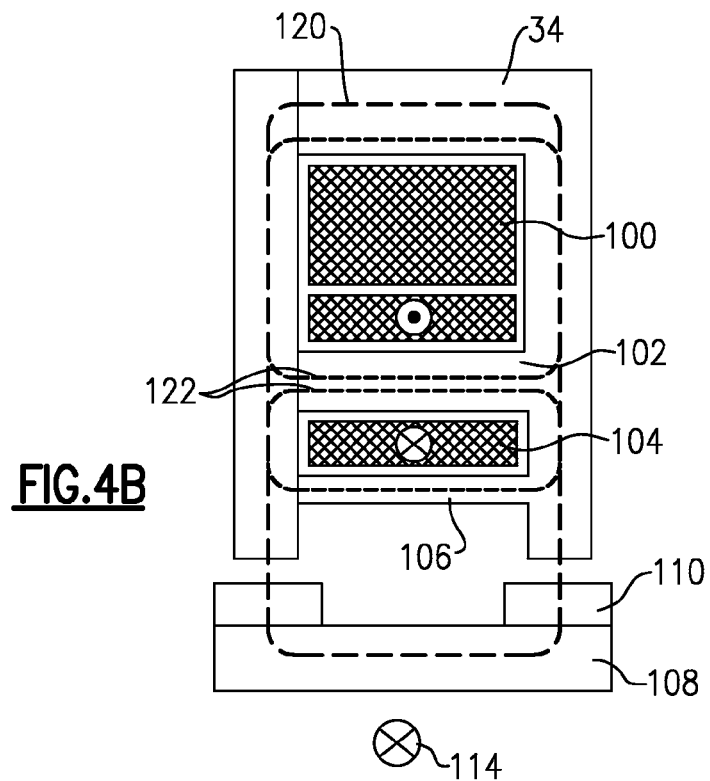
FIG. 4B shows the machine of FIG. 4A in a second condition.

As shown in FIG. 4B, the current in the control winding 104 has increased. The magnetic permeability of diverters 102 and 106 decreases and their reluctance increases.

As shown in FIG. 4B, the flux 122 passing through the diverters 102 and 106 decreases, and more flux 120 tends to pass around the armature coil 100.

As the control current continues to increase, diverters 102 and 106 become saturated, and the magnetic flux generally passes only outwardly of the coil 100 through path 120, such that flux lines from the permanent magnets 110 on the rotor 108 entirely embrace the armature winding 100.

By controlling the current in the control coil 104, the amount of flux that is associated with the armature winding 100 can be controlled, and thus the output of the overall generator can be controlled even with variable input speed.

As can be appreciated, the electromagnetic force vector 114 from this transverse flux machine is transverse to the flux path 112 or 120. As is also clear, the force vector 114 is transverse to the rotational axis of the rotor 108. The magnets 110 are spaced axially along the rotor 108, and at least two of the magnets 110 are associated with the pole piece 34.

In some designs the flux diverter 106 can be removed

FIG. 5 shows a machine embodiment 200 which is a single phase alternator, and which is provided with two channels 204A and 204B, such that it is fault tolerant. The embodiment of FIG. 5 has an internal stator 202 surrounded by the rotor 206 and its permanent magnets 208. Otherwise, the machine operates much like the FIGS. 4A and 4B.

FIG. 6 shows another embodiment 210, wherein the rotor 212 is internal to the stator, and its channels 216A and 216B.

Figure 7:
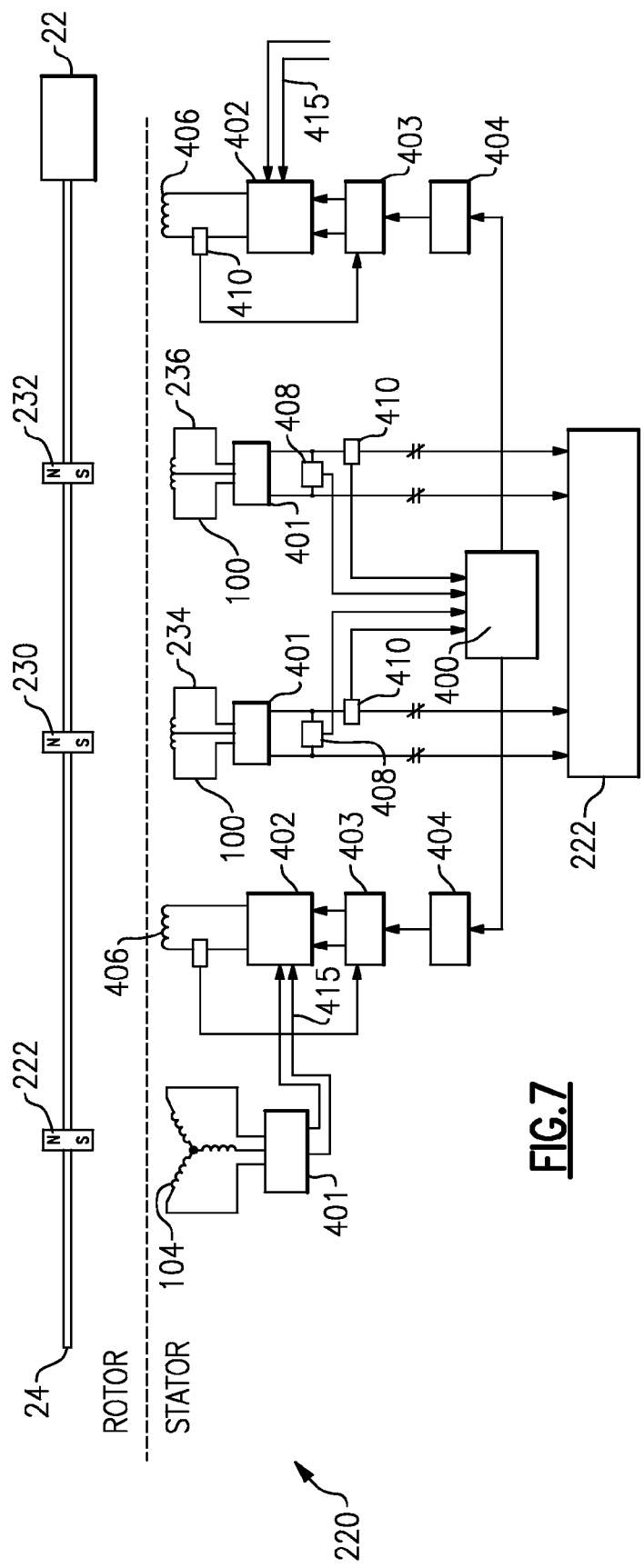
FIG. 7 shows a control circuit for the FIG. 5 and FIG. 6 embodiment.

FIG. 7 shows a system with the dual single phase arrangement associated with the FIGS. 5 and 6 embodiments. As shown, the main windings 100 are provided by separate winding sets 234 and 236 associated with the branches A and B as shown in FIGS. 4 and 5. Further, independent permanent magnet sets 230 and 232 are associated with each of these redundant sets. A central controller 400 includes a load sharing algorithm for paralleling two dc power channels connected to the load. The controller 400 derives the voltage reference signals for each of the channel in response to the feedback signals from voltage sensor 408 and current sensor 410.

Rectifiers 401 provides power to H-bridges 402 that control current in each control coil 406 associated with the winding sets, 234, and 236 in response to the output of the current regulators 403. The voltage regulators 404 generate current reference signals in response to the voltage reference inputs derived at the outputs of controller 400. Rectifier 401 receives power from the control power PMG stator windings 104.

Figure 8:
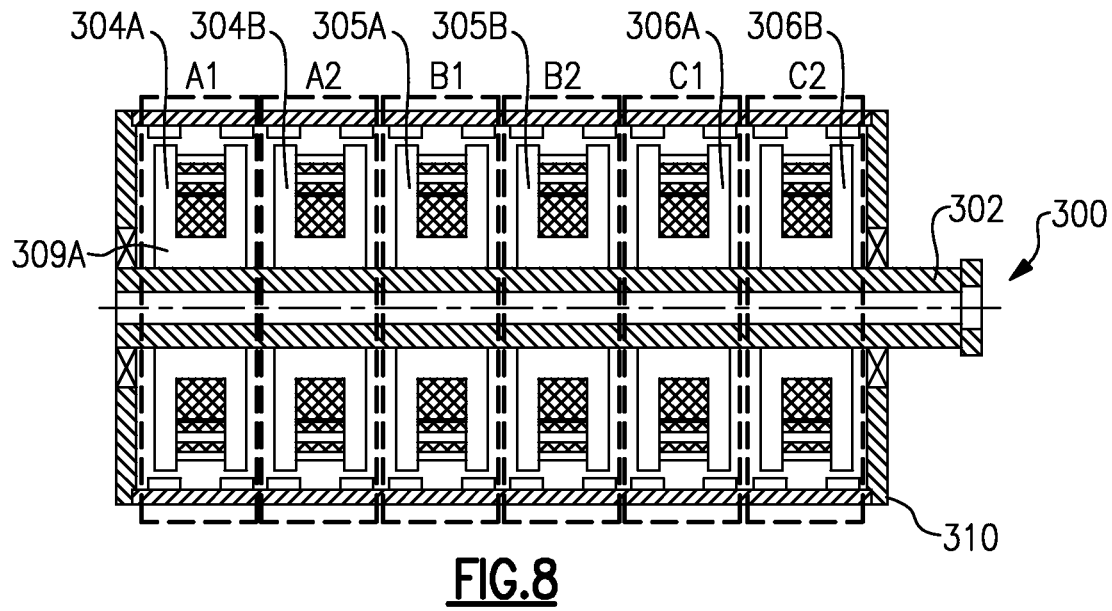
FIG. 8 shows yet another embodiment.

FIG. 8 shows a three-phase alternator, again having redundant circuits for fault tolerance. In FIG. 8 machine 300, the stator 302 is internal, and includes pole pieces 304A/B, 305A/B, and 306A/B, and an external rotor 310.

Figure 9:
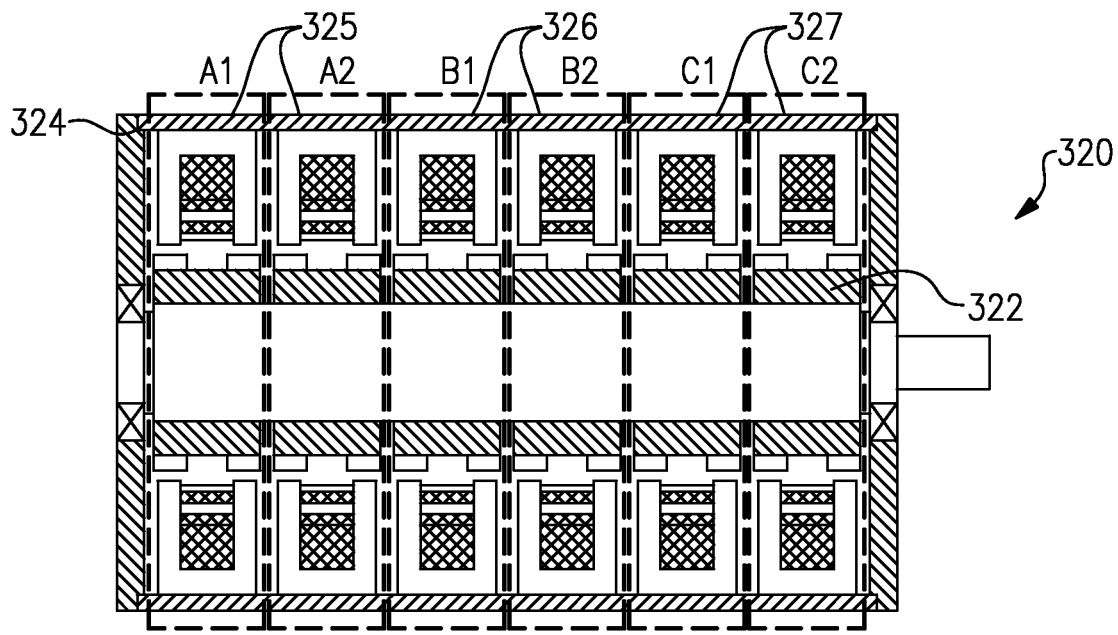
FIG. 9 shows yet another embodiment.

FIG. 9 shows an embodiment 320 having an internal rotor 322, and the redundant three-phase pole pieces 325, 326, and 327 associated with its stator housing 324.

Figure 10:
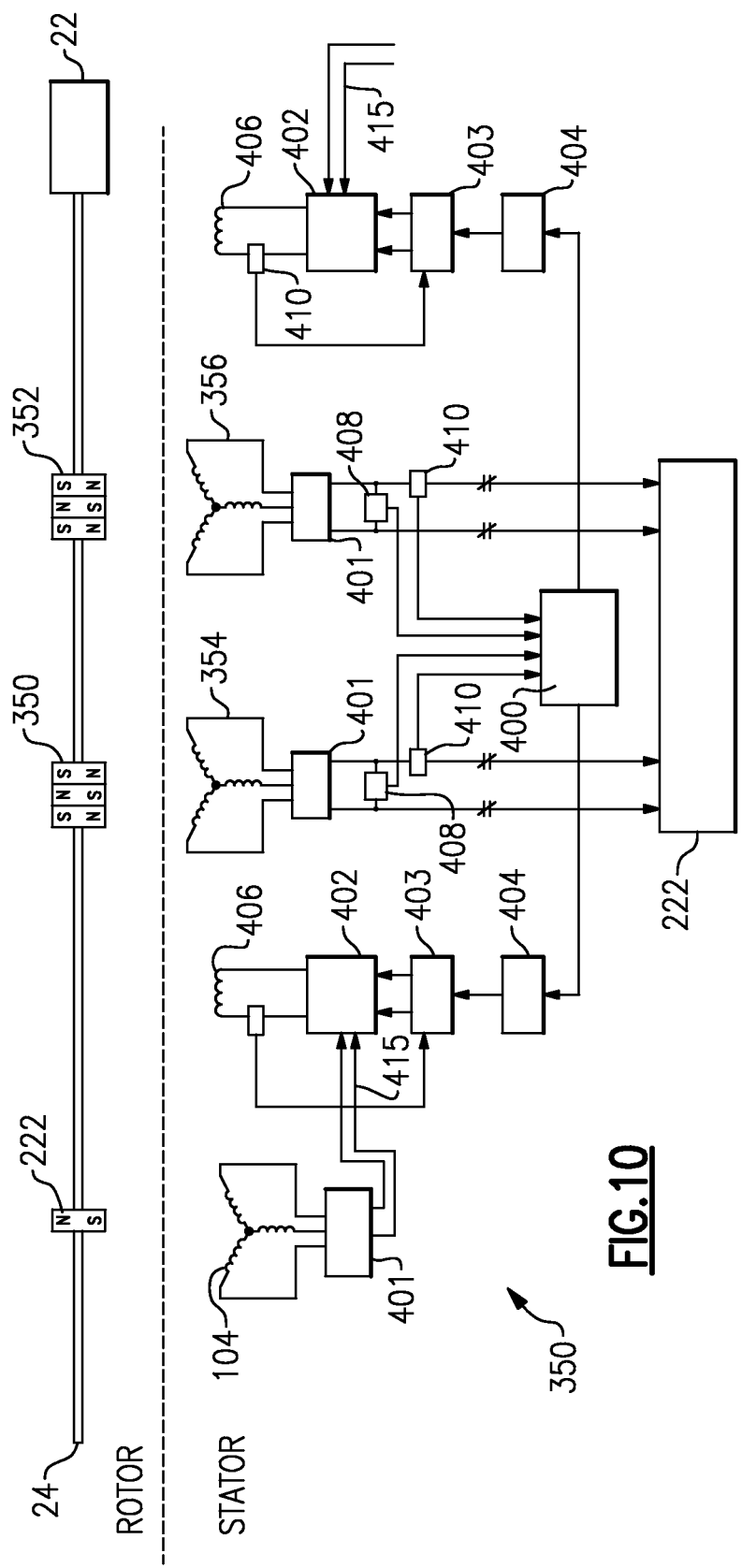
FIG. 10 shows a control circuit for the FIGS. 8 and 9 embodiments.

A control circuit 250 for the FIGS. 8 and 9 embodiment is illustrated in FIG. 10.

In FIG. 10, a system with a three-phase arrangement is illustrated, and associated with the FIG. 8 and FIG. 9 embodiments. The main windings 100 are shown as two separate three-phase winding sets 354 and 356. A central controller 400 includes a load sharing algorithm for paralleling two dc power channels connected to the load. The controller 400 derives the voltage reference signals for each of the channel in response to the feedback signals from voltage sensor 408 and current sensor 410.

Rectifiers 401 provides power to H-bridges 402 that control current in each control coil 406 associated with the winding sets, 354, and 356 in response to the output of the current regulators 403. The voltage regulators 404 generate current reference signals in response to the voltage reference inputs derived at the outputs of controller 400. Rectifier 401 receives power from the control power PMG stator windings 104.

The use of the transverse flux machine provides benefits (high power density, compact construction, simple winding, low winding losses, high efficiency, modular construction) when compared to a standard flux machine. In addition, the use of the voltage regulation through the control coil provides the ability to smooth out speed differences from the prime mover.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. An alternator comprising:
   a rotor to be associated with a prime mover shaft and driven for rotation, said rotor being provided with permanent magnets;
   a stator provided with pole pieces, said pole pieces including a main winding, flux diverters separating said main winding from a control coil; and
   a control for controlling the power passing through said control coil, and the stator and rotor forming a transverse flux alternator, and there being a flux path through said main windings, said control coil and said flux diverters, and a force vector from the transverse flux machine being transverse to the flux path.

2. The alternator as set forth in claim 1, wherein said flux diverters include a first component separating said main winding and said control coil, and a second component separating said control coil from said rotor.

3. The alternator as set forth in claim 2, wherein said rotor is positioned outwardly of said stator.

4. The alternator as set forth in claim 2, wherein said stator is positioned outwardly of said rotor.

5. The alternator as set forth in claim 1, wherein said alternator is a single phase alternator.

6. The alternator as set forth in claim 5, wherein there is a redundant set of stator windings, and associated permanent magnets on said rotor to provide fault tolerance.

7. The alternator as set forth in claim 1, wherein said stator provides three or more phases of power to a load.

8. The alternator as set forth in claim 7, wherein there is a redundant set of stator windings to provide fault tolerance.

9. The alternator as set forth in claim 1, wherein each pole piece is associated with a plurality of axially spaced magnets on said rotor.

10. A vehicle power system comprising:
    a prime mover driving a shaft, said shaft being associated with a rotor of a generator, and said rotor rotating adjacent to a stator;
    the rotor to be associated with a prime mover shaft and driven for rotation, said rotor being provided with permanent magnets;
    the stator provided with pole pieces, said pole pieces including a main winding, flux diverters separating said main winding from a control coil; and
    a control for controlling the power passing through said control coil, and the stator and rotor forming a transverse flux alternator, and there being a flux path through said main windings, said control coil and said flux diverters, and a force vector from the transverse flux machine being transverse to the flux path.

11. The system as set forth in claim 10, wherein said flux diverters include a component separating said main winding and said control winding, and a component separating said control winding from said rotor.

12. The system as set forth in claim 10, wherein said system is a single phase alternator.

13. The system as set forth in claim 10, wherein said stator provides three or more phases of power to a load.

14. The system as set forth in claim 13, wherein there is a redundant set of stator windings, and associated permanent magnets on said rotor to provide fault tolerance.

15. The system as set forth in claim 10, wherein each pole piece being associated with a plurality of axially spaced magnets on said rotor.

16. An alternator comprising:
    a redundant set of pole pieces each including a main winding;
    each main winding positioned within a pole piece;
    said pole piece being provided with flux diverters separating said main winding from a control coil;
    a rotor having permanent magnets associated with each of said redundant sets of pole pieces; and
    a control for varying a voltage supply to said control coil to in turn control the flux passing through said main winding to control the output of the alternator, and wherein said alternator is a transverse flux alternator, and there being a flux path through said main windings, said control coil and said flux diverters, and a force vector from the transverse flux machine being transverse to the flux path.

17. The system as set forth in claim 16, wherein there is a redundant set of stator windings to provide fault tolerance.

18. The alternator as set forth in claim 16, wherein each pole piece is associated with a plurality of axially spaced magnets on said rotor.

* * * * *